(12) United States Patent
Tarvainen et al.

(10) Patent No.: US 7,502,866 B2
(45) Date of Patent: Mar. 10, 2009

(54) METHOD FOR CONFIGURING A BASE STATION IN A TELECOMMUNICATION NETWORK

(75) Inventors: Tomi Tarvainen, Espoo (FI); Jarek Krol, Espoo (FI); Kimmo Autio, Petaluma, CA (US); Jari Torkkel, Vantaa (FI); Jarmo Pyyhtia, Vantaa (FI); Hannu Tuominen, Kauniainen (FI); Juha Okkonen, Espoo (FI)

(73) Assignee: Nokia Corporation, Espoo (FI)

( * ) Notice: Subject to any disclaimer, the term of this patent is extended or adjusted under 35 U.S.C. 154(b) by 591 days.

(21) Appl. No.: 10/169,208

(22) PCT Filed: Jan. 5, 2001

(86) PCT No.: PCT/FI01/00014

§ 371 (c)(1),
(2), (4) Date: Jan. 8, 2003

(87) PCT Pub. No.: WO01/50791

PCT Pub. Date: Jul. 12, 2001

(65) Prior Publication Data

US 2003/0115362 A1  Jun. 19, 2003

(30) Foreign Application Priority Data

Jan. 7, 2000  (FI)  .................................. 20000030

(51) Int. Cl.
*G06F 15/16*  (2006.01)
(52) U.S. Cl. ........................ 709/245; 709/220; 709/221; 709/222; 709/245
(58) Field of Classification Search .................. 709/245, 709/220–222; 455/435.1
See application file for complete search history.

(56) References Cited

U.S. PATENT DOCUMENTS

| | | | | |
|---|---|---|---|---|
| 5,983,090 A | * | 11/1999 | Aoki | 455/403 |
| 6,085,245 A | * | 7/2000 | Kaycee et al. | 709/224 |
| 6,147,986 A | * | 11/2000 | Orsic | 370/349 |
| 6,487,406 B1 | * | 11/2002 | Chang et al. | 455/422.1 |
| 6,522,641 B1 | * | 2/2003 | Siu et al. | 370/338 |

(Continued)

FOREIGN PATENT DOCUMENTS

WO  WO 99/22541  5/1999

(Continued)

*Primary Examiner*—Nathan J Flynn
*Assistant Examiner*—Mohamed Wasel
(74) *Attorney, Agent, or Firm*—Squire, Sanders & Dempsey, LLP

(57) ABSTRACT

A telecommunication network planning and network control includes network installation procedures and a system for configuring a telecommunication network. More specifically, a method and system for configuring a telecommunication network relate to preparing a network element for operation, and giving an address to a network element, where each network element in the telecommunication network has an address of its own. The method and system are further characterized by a process in which each network element is made a subnetwork of its own, a common network-wide IP classification is selected, an IP address is created for each network element, a configuration file is created which includes at least IP address information in combination with a network element site identifier. The configuration file is stored in a control device, and the configuration file is loaded from the control device into the network element on the basis of the site identifier.

20 Claims, 3 Drawing Sheets

U.S. PATENT DOCUMENTS

| | | | |
|---|---|---|---|
| 6,539,225 B1 * | 3/2003 | Lee | 455/436 |
| 6,603,763 B1 * | 8/2003 | Koshino | 370/389 |
| 6,611,522 B1 * | 8/2003 | Zheng et al. | 370/395.21 |
| 6,625,145 B1 * | 9/2003 | Winell | 370/389 |
| 6,633,900 B1 * | 10/2003 | Khalessi et al. | 709/202 |
| 6,647,001 B1 * | 11/2003 | Bhagavath et al. | 370/331 |
| 6,731,621 B1 * | 5/2004 | Mizutani et al. | 370/338 |
| 6,801,788 B1 * | 10/2004 | Csapo et al. | 455/561 |
| 6,801,941 B1 * | 10/2004 | Stephens et al. | 709/225 |
| 6,973,057 B1 * | 12/2005 | Forslow | 370/328 |
| 7,123,626 B1 * | 10/2006 | Feyerabend | 370/466 |
| 2001/0012282 A1 * | 8/2001 | Yegoshin | 370/338 |
| 2001/0030977 A1 * | 10/2001 | May | 370/475 |
| 2002/0021675 A1 * | 2/2002 | Feldmann | 370/254 |
| 2006/0036707 A1 * | 2/2006 | Singh et al. | 709/217 |

FOREIGN PATENT DOCUMENTS

| | | |
|---|---|---|
| WO | WO 99/35800 | 7/1999 |
| WO | WO 99/43174 | 8/1999 |
| WO | WO 00/01083 | 1/2000 |

* cited by examiner

PRIOR ART

METHOD FOR CONFIGURING A BASE STATION IN A TELECOMMUNICATION NETWORK

PRIORITY CLAIM

This is a national stage of PCT application No. PCT/FI01/00014, filed on Jan. 5, 2001. Priority is claimed on patent application No. 20000030 filed in Finland on Jan. 7, 2000.

FIELD OF THE INVENTION

This invention relates to telecommunication network planning and network control as well as to network installation procedures. In particular the invention relates to a method for configurating a telecommunication network, preparing a network element for operation, and giving an address to a network element, in which telecommunication network each network element has an address of its own.

TECHNICAL BACKGROUND

A base station network in a mobile communication system comprises primarily base stations (BS) and a base station controller (BSC). The base station controller controls the operation of the base stations. The BSC is connected to a mobile switching center (MSC). The base stations provide connections to mobile phones through the air interface. The base stations are connected to the BSC through a radio link, copper cable or optical cable. Between the base stations and base station controllers there are usually cross-connects which take care of the switching of connections between the various devices. The tasks of the BSC include controlling the transmission power of mobile stations and carrying out handovers for mobile stations. The base station controllers are connected to a mobile switching center which handles the mobile telephone traffic in its geographical area. Its tasks include routing of calls, call management and termination of calls. Furthermore, the mobile switching center is connected to registers containing user information such as e.g. the home location register HLR and visitor location register VLR and a network management system NMS. FIG. 1 shows a block diagram of a typical base station network architecture. The base station network comprises base stations 10 and base station controllers 20. The base station controller 20 is connected to a mobile switching center MSC 30 in the mobile communication network. In addition, FIG. 1 shows mobile stations 5 connected to the base station network.

As the Internet gains more popularity, the technology involved, in particular the technology associated with IP (Internet Protocol) networks, has become cheaper and has been introduced in many fields of application. IP network technology is already being used in mobile communication systems as well, especially in setting up base station networks. In an IP network each device in the network has a unique address within the network. If a device has got several interfacing ports to the network, each port is given an IP address of its own. There are two versions of the IP protocol. Version 4 of the IP protocol (IPv4) is specified in the document RFC 791. Version 6 of the IP protocol (IPv6) is specified in the document RFC 1883.

An IPv4 address consists of a string of 32 bits. FIG. 2 illustrates the structure of IPv4 address. IPv4 addresses are currently divided into five classes: A, B, C, D and E. The most significant bits in the address indicate the class of the address. A, B and C class IP addresses are divided into two parts: the net part and the host part. The net part identifies the network to which the host is connected, and the host part identifies the host's connection port to the network. By reserving more bits to the net part and fewer bits to the host part it is possible to assign addresses to an overall network architecture comprising a large number of discrete networks. Such a case of course involves the restriction that a discrete network cannot contain very many recipients. Conversely, if we have a few large networks with a large number of users in them, then it is best to choose a net part comprising fewer bits and a host part comprising many bits. A D-class address comprises a so-called multicast address, and class E is reserved for future use. IP addresses are unique, so granting and assigning IP addresses must be supervised so that one and the same address not be given more than once.

A new device attached to an IP network needs an IP address of its own. A popular way to implement the allocation of an IP address to a new device attached to the network is to have the new device request the IP address from a DHCP (Dynamic Host Configuration Protocol) server or BOOTP (Bootstrap Protocol) server either in the same or in a different network. The DHCP server keeps track, in a centralized manner, of the IP addresses required by a network in the geographical area assigned to it. The DHCP or BOOTP server allocates the new device a free IP address and sends information about it to the new device. As soon as the new device has got an IP address, it is able to communicate in the network. Another alternative, somewhat more complicated though, is to program an IP address for the new device already before it is delivered to its final destination, but this calls for very careful network planning and maintenance.

If the network topology is such that a router is connected to an outside network via one route only and to the internal network hierarchy via multiple ports, then the network elements connected to each one of the ports can be regarded as discrete subnetworks. Therefore, a so-called subnetwork mask can be used in the IP addresses. Subnetwork mask means that the host part of the IP address is divided into two parts: a part specifying the subnetwork and the host part proper. Thus, when the subnetwork is being implemented, the IP addresses in the subnetwork can be compiled such that the combination of the part specifying the subnetwork and the net part proper is considered the internal net part of the subnetwork.

In order to make network planning easier, the base station network can be divided into subnetworks which are planned separately. A subnetwork may consist of e.g. several base stations located in one and the same geographical area. In addition, a so called DCN (Data Communication Network) for the subnetwork has to be set up for the purpose of network control. Subnetwork planning is usually quite a laborious and time-consuming phase in network planning.

If human errors such as incorrectly installed cross-connections, incorrectly positioned radio links etc. occurred during the installation of a network, a connection to a DHCP or BOOTP server cannot be established. Such errors in the installation stage of the network are quite usual due to e.g. differing installation schedules of the various parts of network. A new device must also be provided with a connection to the network control system, whereby this, too, is made uncertain by the factors mentioned above. Therefore, an easier base station installation method is needed

SUMMARY OF THE INVENTION

An object of the invention is to provide an installation method for base station network elements, eliminating the disadvantages mentioned above. Another object of the invention is to provide an installation method for base station network elements which simplifies the installation of a base station network based on an IP communication network.

The objects of the invention are achieved by arranging for a special installation file specifying the parameters for the element to be installed, which parameters can be loaded into the network element on-site. A correct installation file can be stored for the correct network element on the basis of predetermined criteria.

The method according to the invention for configuring a telecommunication network, preparing a network element for operation and giving an address to a network element, in which telecommunication network each network element has an address of its own, is characterized in that the method comprises steps in which
- each network element is made a subnetwork of its own (301),
- a common network-wide IP classification is selected (302),
- an IP address is created for each network element (303),
- a configuration file is created which comprises at least IP address information in combination with a network element site identifier (304),
- the said configuration file is stored in a control device (305), and
- the said configuration file is loaded from the control device into the network element on the basis of the site identifier (306).

The system according to the invention for configurating a telecommunication network, preparing a network element for operation and giving an address to a network element, in which telecommunication network each network element has an address of its own, is characterized in that the system comprises
- means (401) for selecting a common network-wide IP classification and for making each network element a subnetwork of its own,
- means (402) for creating IP addresses for the network elements,
- means (403) for creating a configuration file which comprises at least IP address information in combination with a network element site identifier,
- means (404) for storing the said configuration file in a control device, and
- means (405) for reading the said configuration file from the control device into a network element on the basis of the site identifier.

The method according to the invention utilizes advantageously a predetermined, fixed and network-wide subnetwork mask. Furthermore, each node in the network is regarded in the method according to the invention as a subnetwork of its own so that each individual network element can be given a unique IP address. In accordance with the method according to the invention, a site identifier is created for each network element, on the basis of which site identifier the new network element can be transported to its place of installation and the right configuration file can be selected in the control device in the installation phase. By means of the method according to the invention it is possible to automatically configurate the base station network to be installed. The telecommunication system according to the invention comprises the means with which the method described above can be implemented.

BRIEF DESCRIPTION OF THE DRAWINGS

The invention is below described more closely with reference to the accompanying drawings in which

Like elements in the drawings are denoted by like reference designators. FIGS. 1 and 2 were already discussed above in conjunction with the description of the prior art.

DETAILED DESCRIPTION OF PREFERRED EMBODIMENTS

Figures 1, 2:
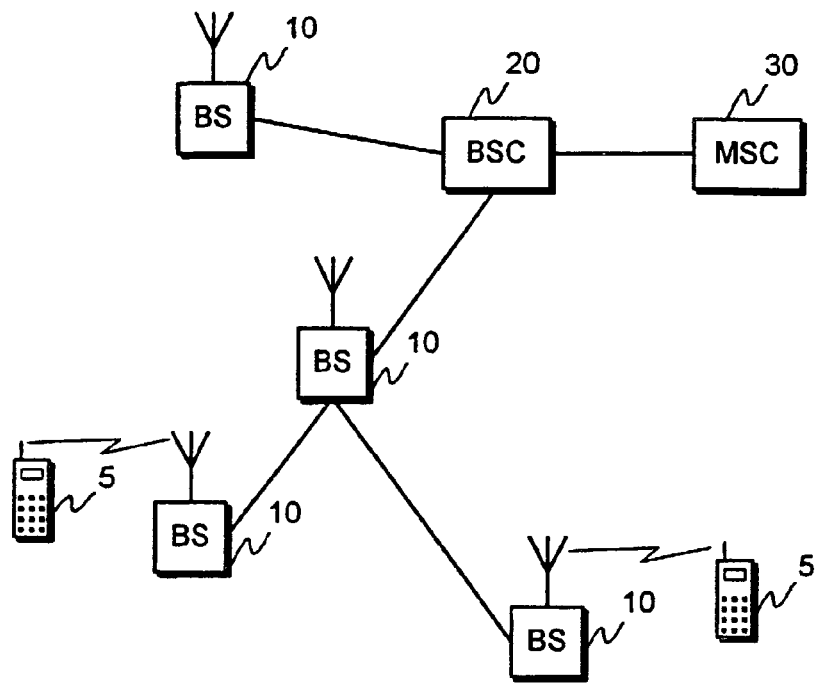
FIG. 1 shows an example of a typical base station network.
FIG. 2 illustrates the structure of IP addresses.

Let us first consider the network planning and set-up process in general outline. At the initial stage, the necessary preliminary studies and measurements are carried out in the area where the network is to be installed. Also at the initial stage, planning is done regarding the required radio links, capacities and other things essential to radio communication connections. After various planning processes, the data are delivered to a factory where the necessary network elements are compiled in order to build a radio network according to the plan.

As is known, every network element handling data traffic needs an IP address by which it can be identified. IP address generation can be realized by a specially designed element, for example. Such an element is called a generating element, for instance. The generating element comprises a means with which it can produce IP addresses such that no two network elements are given the same IP address. Correspondingly, a so-called site identifier, or site ID, is generated for each device to be built, by means of which site ID the network elements built can be transported to their correct locations. The site ID may be e.g. a sequence of digits giving the correct location information for the network element, whereby the device in question can be transported to the right location. According to another preferred embodiment the said site ID may simply comprise the coordinates for the geographical location of the network element in question. Advantageously the installer of the network element stores the said IP address and site ID in a control device such as a portable computer used for on-site network element installation. Advantageously the said information is stored e.g. in a so-called configuration file which is uploaded to the network element on the site.

In applying the solution according to the invention it is advantageously required that each network node is a subnetwork of its own. In this exemplary embodiment this means that each one of the network cross-connects through which the base stations BS are connected to the base station controller BSC, constitutes a subnetwork of its own. Since each cross-connect functions as a router, a routing protocol can be used between the cross-connects. Moreover, the arrangement described has the advantage that, as far as address generation is concerned, it suffices that each subnetwork is configured uniquely, i.e. so that each network element in the subnetwork has an IP address of its own.

Another thing to observe in applying the solution according to the invention is that the whole network conforms to a common standard subnetwork mask. This means that the IP addresses in the network are in accordance with a certain predetermined structure. The IP address structure is selected on the basis of subnetwork size. Enough bits are reserved for the net part and host part of the IP address so that each network element can be given a unique IP address.

It is obvious to a person skilled in the art that since every network node advantageously functions as a subnetwork of its own and since the network has a common subnetwork mask, the router network can be set up, whereby individual network elements can start operating, as soon as the link connections between the different sets of devices are established. This arrangement according to the invention brings the advantage that the only thing to observe in the network planning is that every network node is given an unequivocal network identifier. An unequivocal network identifier means a network identifier which is unique within the whole network.

Figure 3:
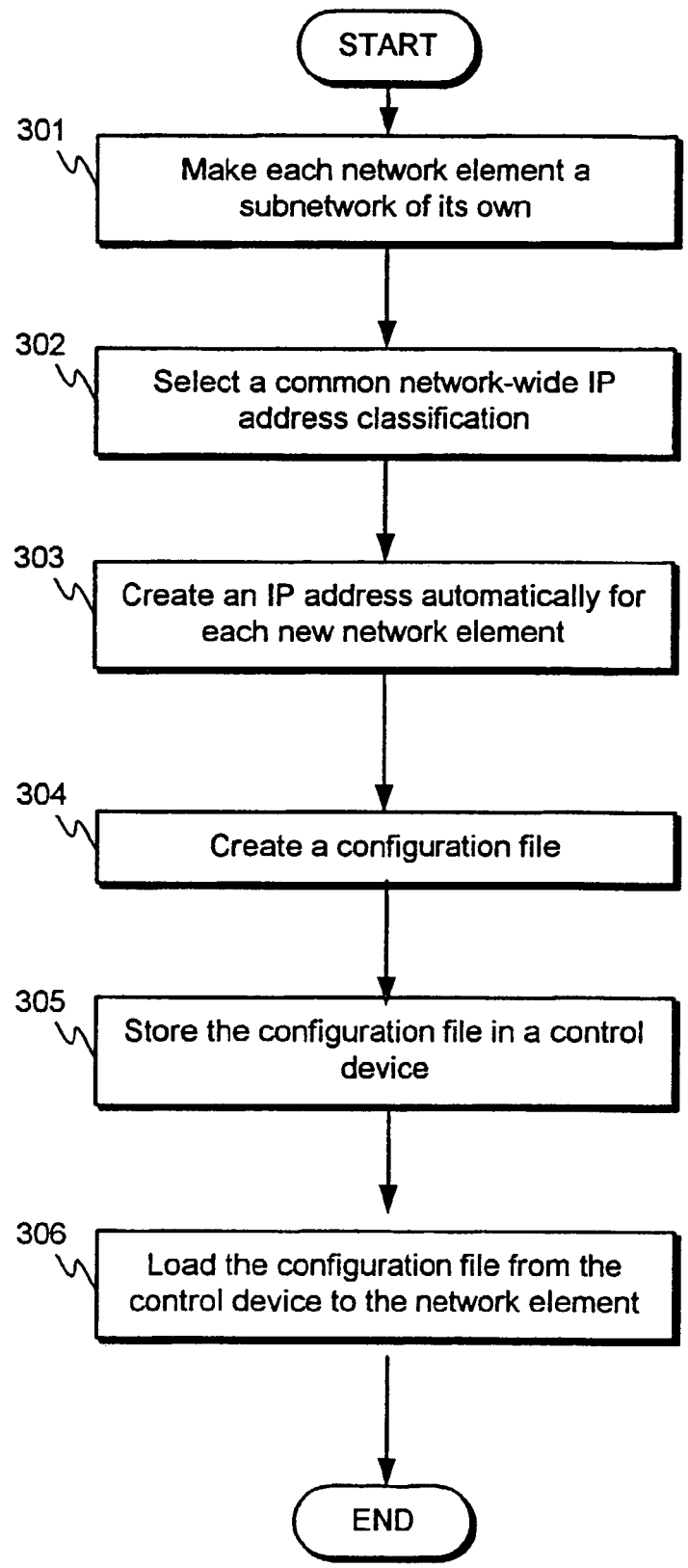
FIG. 3 shows a flow diagram according to a preferred embodiment of the invention.

Let us next consider the method according to the invention shown in FIG. 3 for connecting a new network element, such as a cross-connect or base station BS, to an existing network. A principal idea of the invention is that each network element is set up as a subnetwork of its own 301. Another principal idea of the invention is that a common IP address classification is selected for the network 302. Next, the network element is given a unique IP address 303 which is stored together with other information in a configuration file 304. The configuration file advantageously comprises a site ID by means of which the configuration file of each new network element can be loaded into the right network element. Advantageously the IP address and site ID are created automatically. After planning and generation, the said configuration file is transferred to a so-called control device 305, meaning a device where the installer has stored all the configuration files for all the different network elements and which control device can be connected to the new network element for uploading the data. The installer of the network element loads the configuration file into the new network element by means of the control device on the site of the new network element 306. The correct file is advantageously selected on the basis of the site ID. It is obvious to a person skilled in the art that the said network element may be any element in a telecommunication network. Especially advantageously it is a base station BS.

It is obvious to a person skilled in the art that using the arrangement according to the invention in which each network element is a subnetwork of its own and the whole network has a common subnetwork mask, one can avoid one of the most laborious stages in network planning, i.e. subnetwork DCN planning, where the DCN network is used in network control.

One of the consequences of the arrangement according to the invention is that possible errors made in the installation phase of a network element will not prevent the setting up of the network element. As the network element can be brought into operating condition completely without radio communication, the installation of the network element can be completed even if not all network portions of the network in question are functioning when the network element is being installed.

Figure 4:
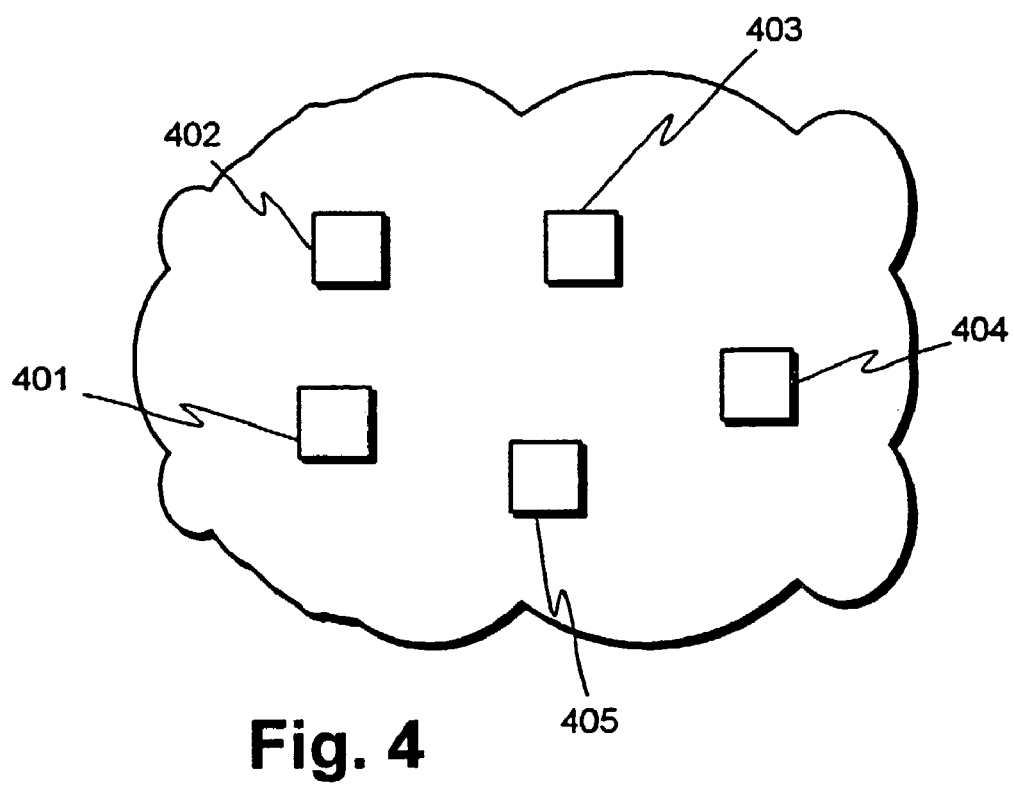
FIG. 4 shows a telecommunication system according to the invention.

A telecommunication system according to the invention comprises means for setting up a network element and giving an address to a network element. FIG. 4 shows a system according to a preferred embodiment, comprising in its entirety a first means 401 to select a common network-wide IP classification and to make each network element a subnetwork of its own. After the IP-classification the system comprises a second means 402 for creating an individual IP address for every network element. After the IP address generation, the system generates a configuration file using a means 403 intended for this purpose. A configuration file advantageously comprises the IP address of a given network element together with the geographical location data for the network element in question. A telecommunication system according to the invention further comprises a means 404 by which the said configuration file can be stored in a control device. The system also comprises a means 405 for reading the configuration file from the control device into the network element on the basis of the geographical location data. It is obvious to a person skilled in the art that the means described above can be regarded as software arranged so as to be loaded into a microprocessor in order to implement the functions of the means described above.

Figure 5:
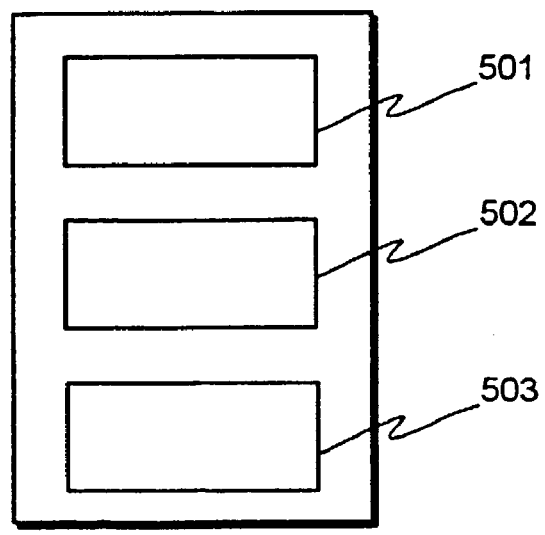
FIG. 5 shows a control device according to the invention.

Let us next consider a control device according to the invention shown in FIG. 5 which is used to convey the configuration file to the element to be installed. The control device advantageously comprises a means 501 by which the configuration file, which was created in the network planning phase, can be stored in a control device. Advantageously the control device comprises a means 502 where the said configuration files can be stored. Such a means may comprise e.g. a memory circuit in the control device. In addition the control device comprises a means 503 by which the configuration file stored-therein can be transferred to the network element to be installed. The control device may also be adapted so as to include a means by which the geographical location of the control device can be determined automatically. This is of particular advantage in a situation where the site ID directly comprises the geographical coordinates of the new network element. The configuration file to be loaded into the network element has been stored in the control device on the basis of the geographical coordinates, so automatic geographical positioning of the control device can be used especially advantageously to find the correct configuration file for the network element. The geographical positioning may be realized using either an integrated or separate GPS (Global Positioning System) device, for example. Control devices suitable for the arrangement according to the invention may include e.g. a portable personal computer or a PDA (Personal Digital Assistant) or some other similar device comprising the means described above. It is obvious to a person skilled in the art that the configuration file may be loaded into the network element also through a mobile station or the like. This naturally requires that in the place where the new network element is being installed, there must already exist the preconditions for radio communication or that the mobile station has enough memory capacity for storing the configuration files. If the control device is a mobile station and the configuration files are sent to the control device by radio, the mobile station is arranged, if necessary, to utilize another radio network system operating in the same area to receive the configuration file when the network, which is being set up, is not yet functioning.

Advantageously the configuration file contains the information required by the new element in order to set it up in the network. Especially advantageously the file combines the site ID of the new element with the IP address of the network element. As soon as the configuration file is stored in the network element, the network element is ready to communicate with other existing network elements, for it has got an IP address of its own. The method described has also the advantage that even if there is no control channel at the time of installing the element, the installation can be completed and, moreover, without error messages, for as the new element also functions as a router, it is able to update its files according to changes in the surrounding network. A control channel can be established for the network element at the latest when a permanent connection is established for the element via the network.

The method according to the invention involves several other advantages, too. For example, in base station network planning there is no need for separate planning for IP network addresses and other parameters since they can be created automatically as each network element forms a subnetwork of its own. Moreover, since a predetermined class is used for the IP addresses, difficult and time-consuming subnetwork planning is avoided and existing IP routing procedures for the class in question can be used. The base station network to be installed starts operating as an IP network with all the usual IP network functions as soon as at least two elements are interconnected. This, in turn, simplifies testing and diagnostics considerably.

It is obvious to a person skilled in the art that network planning and the method according to the invention can be realized e.g. within a network management system (NMS). This makes network management and maintenance easier. The method may also be realized in network planning stages other than those mentioned here by way of example. Especially it is obvious that the method according to the invention is primarily meant to be used in private IP networks.

The method according to the invention can be used both in networks based on the IPv4 and in networks based on the IPv6 protocol. Moreover, the method according to the invention for installing an element in a base station network can be applied in the GSM (Global System for Mobile communications), UMTS (Universal Mobile Telecommunication System) and other digital mobile communication systems in which an IP network can be used as a communications network of the base station network.

The name of a given functional unit, such as base station controller, is often different in different cellular network systems. For example, in the UMTS the functional unit equivalent to the base station controller (BSC) is the radio network controller (RNC). Therefore, the terminology in this application as regards network elements is, for reasons of clarity, in accordance with the GSM system, but the invention is not limited solely to the GSM system.

In view of the foregoing it is obvious to a person skilled in the art that various modifications can be made without departing from the scope of the invention. Although an advantageous embodiment of the invention was described in detail, it is obvious that various modifications to and variations on the embodiment are possible, which modifications and variations are in accordance with the true spirit and scope of the invention.

What is claimed is:

1. A method for configuring a telecommunication network, comprising:
   selecting a common network-wide internet protocol classification;
   creating an internet protocol address for each network element in a telecommunication network, wherein each network element corresponds to a specific internet protocol subnetwork comprising the internet protocol address;
   creating a configuration file which comprises at least internet protocol address information in combination with a network element site identifier;
   storing the configuration file in a control device; and
   transmitting the configuration file from the control device to each network element based on the network element site identifier.

2. The method of claim 1, wherein the internet protocol address is created for each network element automatically.

3. The method of claim 1, wherein the site identifier comprises a sequence of symbols.

4. The method of claim 1, wherein the site identifier comprises geographical coordinates of a new network element.

5. An apparatus for configuring a telecommunication network, comprising:
   a classifier configured to select a common network-wide internet protocol classification and to make each network element in a telecommunication network a subnetwork of its own in a planning process of the telecommunication network;
   an address creator configured to create internet protocol addresses for said each network element;
   a configuration file creator configured to create a configuration file which comprises at least internet protocol address information in combination with a network element site identifier;
   a memory configured to store the configuration file in a control device; and
   a transmitter configured to transmit the configuration file from the control device to said each network element based on the network element site identifier.

6. The apparatus of claim 5, wherein the network element is a base station.

7. The apparatus of claim 5, wherein the control device is a computer.

8. The apparatus of claim 5, wherein the control device is a personal digital assistant.

9. The apparatus of claim 5, wherein the control device is a mobile station.

10. The method of claim 3, wherein the sequence of symbols comprises a sequence of digits giving correct location information for the network element.

11. A method for creating a configuration file for configuring a telecommunication network, comprising:
    selecting a common network-wide internet protocol classification;
    creating an internet protocol address for each network element, wherein each network element in a telecommunication network is a network element specific internet protocol subnetwork;
    creating a configuration file which comprises at least internet protocol address information in combination with a network element site identifier for at least one network element;
    storing the configuration file in a control device; and
    transmitting the configuration file from the control device to each network element based on the network element site identifier.

12. The method of claim 11, wherein the network element site identifier comprises a sequence of symbols.

13. The method of claim 12, wherein the sequence of symbols comprises a sequence of digits giving correct location information for the network element.

14. The method according to claim 11, wherein the site identifier comprises geographical coordinates of a new network element.

15. An apparatus for configuring a telecommunication network, comprising:
    a classifier configured to select a common network-wide internet protocol classification and to make each network element in a telecommunication network a subnetwork of its own in a planning process of the telecommunication networks;
    an address creator configured to create internet protocol addresses for network elements; and
    a configuration file creator configured to create a configuration file which comprises at least internet protocol address information in combination with a network element site identifier for at least one of the network elements.

16. A computer program embodied on a computer readable storage medium, the computer program being configured to control a processor to perform:
    selecting a common network-wide internet protocol classification;
    creating an internet protocol address for each network element, wherein each network element in a telecommunication network is a network element specific internet protocol subnetwork; and
    creating a configuration file which comprises at least internet protocol address information in combination with a network element site identifier for at least one network element to provide an installation and configuration of a network element on an internet protocol communication network.

17. An apparatus for configuring a telecommunication network, comprising:
    an address creator configured to create creating means for creating an internet protocol subnetwork defining an internet protocol address for each network element in a telecommunication network, wherein the network element corresponds to a specific, separate network;
    a selector configured to select selecting mean~for selecting a common network-wide internet protocol classification;
    a configuration file creator configured to create creating means for creating internet protocol addresses for network elements and further configured to create a configuration file which comprises at least internet protocol address information in combination with a network element site identifier; and
    a transmitter configured to transmit said configuration to each network element based on the network element site identifier.

18. An apparatus for configuring a telecommunication network, comprising:
    classification means for selecting a common network-wide internet protocol classification and to make each network element in a telecommunication network a subnetwork of its own in a planning process of the telecommunication network;
    creating means for creating internet protocol addresses for network elements; configuration means for creating a configuration file which comprises at least internet protocol address information in combination with a network element site identifier;
    storage means for storing the configuration file in a control device; and
    transmitting means for transmitting the configuration file from the control device to each network element based on the network element site identifier.

19. An apparatus for configuring a telecommunication network, comprising:
    classifying means for selecting a common network-wide internet protocol classification and to make each network element in a telecommunication network a subnetwork of its own in a planning process of the telecommunication network;
    creating means for creating internet protocol addresses for network elements; and
    configuration means for creating a configuration file which comprises at least internet protocol address information in combination with a network element site identifier for at least one of the network elements.

20. An apparatus for configuring a telecommunication network, comprising:
    selecting means for selecting a common network-wide internet protocol classification;
    creating means for creating internet protocol addresses for network elements and for creating a configuration file which comprises at least internet protocol address information in combination with a network element site identifier, wherein the network elements in a telecommunication network are each a network element specific internet protocol subnetwork; and
    transmitting means for transmitting said configuration file to each network element based on the network element site identifier.

\* \* \* \* \*